(12) United States Patent
Lee et al.

(10) Patent No.: US 8,956,767 B2
(45) Date of Patent: *Feb. 17, 2015

(54) COMPOSITE SEPARATOR FOR POLYMER ELECTROLYTE MEMBRANE FUEL CELL AND METHOD FOR MANUFACTURING THE SAME

(75) Inventors: Dai Gil Lee, Daejeon (KR); Ha Na Yu, Gyeongsangbuk-do (KR); Jun Woo Lim, Daejeon (KR); Sae Hoon Kim, Gyeonggi-do (KR); Jung Do Suh, Seoul (KR); Byung Ki Ahn, Gyeonggi-do (KR)

(73) Assignees: Hyundai Motor Company; Korea Advanced Institute of Science and Technology

( * ) Notice: Subject to any disclaimer, the term of this patent is extended or adjusted under 35 U.S.C. 154(b) by 782 days.

This patent is subject to a terminal disclaimer.

(21) Appl. No.: 12/823,855

(22) Filed: Jun. 25, 2010

(65) Prior Publication Data

US 2011/0129737 A1    Jun. 2, 2011

(30) Foreign Application Priority Data

Nov. 30, 2009    (KR) .................. 10-2009-0116606

(51) Int. Cl.
*H01M 2/16*    (2006.01)
*H01M 8/02*    (2006.01)
(Continued)

(52) U.S. Cl.
CPC .......... *H01M 8/0226* (2013.01); *B32B 38/0004* (2013.01); *H01M 8/0213* (2013.01);
(Continued)

(58) Field of Classification Search
USPC ......... 429/129, 247, 514, 513, 518, 457, 443; 156/267, 276; 264/105
See application file for complete search history.

(56) References Cited

U.S. PATENT DOCUMENTS 6,884,538 B2    4/2005 Suzuki et al.
6,895,649 B2 *  5/2005 Kojo et al. ............. 29/407.01
(Continued)

FOREIGN PATENT DOCUMENTS

JP    11-297338 A    10/1999
JP    2009-129601 A   6/2009
(Continued)

OTHER PUBLICATIONS

JP 2009-129601 (MT).*

*Primary Examiner* — Patrick Ryan
*Assistant Examiner* — Alex Usyatinsky
(74) *Attorney, Agent, or Firm* — Mintz Levin Cohn Ferris Glovsky and Popeo, P.C.; Peter F. Corless

(57) ABSTRACT

The present invention provides a composite separator for a polymer electrolyte membrane fuel cell (PEMFC) and a method for manufacturing the same, in which a graphite foil prepared by compressing expanded graphite is stacked on a carbon fiber-reinforced composite prepreg or a mixed solution prepared by mixing graphite flake and powder with a resin solvent is applied to the cured composite prepreg such that a graphite layer is integrally molded on the outermost end of the separator.
For this purpose, the present invention provides a method for manufacturing a composite separator for a polymer electrolyte membrane fuel cell, the method including: preparing a prepreg as a continuous carbon fiber-reinforced composite and a graphite foil; allowing the cut prepreg and graphite foil to pass through a stacking/compression roller to be compressed; allowing the prepreg in which the graphite foil is integrally stacked to be heated and pressed by a hot press such that hydrogen, air, and coolant flow fields are formed or to pass through a hot roller to be formed into a separator; removing unnecessary portions from the heated and pressed separator using a trim cutter; and post-curing the thus formed separator, wherein the graphite foil may be stacked on the prepreg as the continuous carbon fiber-reinforced composite such that a graphite layer is integrally formed with the prepreg.

3 Claims, 7 Drawing Sheets

(51) Int. Cl.
  *B32B 38/00* (2006.01)
  *B32B 37/00* (2006.01)
  *H01M 8/10* (2006.01)

(52) U.S. Cl.
  CPC .......... *H01M8/0228* (2013.01); *B32B 37/0053* (2013.01); *B32B 2305/076* (2013.01); *B32B 2309/04* (2013.01); *B32B 2309/105* (2013.01); *B32B 2309/12* (2013.01); *B32B 2313/04* (2013.01); *B32B 2457/18* (2013.01); *H01M 2008/1095* (2013.01); *Y02E 60/50* (2013.01)
  USPC .......... 429/247; 429/514; 429/513; 429/457; 429/443; 429/518; 429/129; 156/267; 156/276; 264/105

(56) References Cited

U.S. PATENT DOCUMENTS

| | | | |
|---|---|---|---|
| 7,172,825 B2 * | 2/2007 | Adams et al. | 429/443 |
| 2007/0125493 A1 * | 6/2007 | Jang et al. | 156/324 |
| 2008/0118802 A1 * | 5/2008 | Szrama et al. | 429/30 |

FOREIGN PATENT DOCUMENTS

| | | |
|---|---|---|
| KR | 10-0808332 B1 | 2/2008 |
| KR | 10-2008-0090816 | 10/2008 |
| KR | 10-2009-0072709 | 7/2009 |
| KR | 10-2009-0094560 | 9/2009 |
| KR | 10-2009-0112771 A | 10/2009 |

* cited by examiner

CROSS SECTION VIEW OF THE COMPOSITE+GF PLATE

COMPOSITE SEPARATOR FOR POLYMER ELECTROLYTE MEMBRANE FUEL CELL AND METHOD FOR MANUFACTURING THE SAME

CROSS-REFERENCE TO RELATED APPLICATION

This application claims under 35 U.S.C. §119(a) the benefit of Korean Patent Application No. 10-2009-0116606 filed Nov. 30, 2009, the entire contents of which are incorporated herein by reference.

BACKGROUND (a) Technical Field

The present disclosure relates to a separator for a polymer electrolyte membrane fuel cell (PEMFC). More particularly, it relates to a composite separator for a PEMFC and a method for manufacturing the same, in which a graphite foil prepared by compressing expanded graphite is stacked on a carbon fiber-reinforced composite prepreg or a mixed solution prepared by mixing graphite flake and powder with a resin solvent is applied to the cured composite prepreg such that a graphite layer is integrally molded on the outermost end of the separator.

(b) Background Art

In general, a polymer electrolyte membrane fuel cell (PEMFC) is a device that generates electricity with water produced by an electrochemical reaction between hydrogen and oxygen. The PEMFC has various advantages such as high energy efficiency, high current density, high power density, short start-up time, and rapid response to a load change as compared to the other types of fuel cells. For these reasons, it can be used in various applications such as a power source for zero-emission vehicles, an independent power plant, a portable power source, a military power source, etc.

The configuration of a fuel cell stack will be briefly described with reference to FIG. 1 below.

In a typical fuel cell stack, a membrane-electrode assembly (MEA) is positioned in the center of each unit cell of the fuel cell stack. The MEA comprises a solid polymer electrolyte membrane 60, through which hydrogen ions (protons) are transported, and catalyst layers including a cathode 61 and an anode 61, which are coated on both surfaces of the electrolyte membrane 60 to allow hydrogen and oxygen to react with each other.

Moreover, a gas diffusion layer (GDL) 40 and a gasket 41 are sequentially stacked on the outside of the electrolyte membrane 10, i.e., on the surface where the cathode and the anode are positioned. A separator (also called a bipolar plate) 30 including flow fields, through which fuel is supplied and water generated by a reaction is discharged, is positioned on the outside of the GDL 40. And, an end plate 50 for supporting the above-described elements is connected to the outermost end.

Therefore, an oxidation reaction of hydrogen occurs at the anode of a fuel cell to produce hydrogen ions (protons) and electrons, and the produced hydrogen ions and electrons are transmitted to the cathode through the electrolyte membrane and the separator, respectively. At the cathode, the hydrogen ions and electrons transmitted from the anode through the electrolyte membrane and the separator react with oxygen in air to produce water. Here, electrical energy is generated by the flow of the electrons through an external conducting wire due to the transfer of the hydrogen ions.

In the above-described fuel cell stack, the separator separates the respective unit cells of the fuel cell and, at the same time, serves as a current path between the unit cells, and the flow fields formed in the separator serve as paths through which hydrogen and oxygen are supplied and water produced by the reaction is discharged.

Since the water produced by the reaction inhibits the chemical reaction occurring in the electrolyte membrane of the fuel cell, the water should be rapidly discharged to the outside, and therefore the separator material may have high surface energy such that the water is rapidly spread on the surface of the separator (hydrophilicity) or may have low surface energy such that the water rolls down the surface of the separator (hydrophobicity).

Therefore, it is necessary to minimize the electrical contact resistance between the separators and, at the same time, maximize the hydrophilicity or hydrophobicity of the flow fields to allow the product water to smoothly flow.

Conventionally, the separator is formed of graphite, thin stainless steel, or a composite material in which expanded carbon particles or graphite particles are mixed with a polymer matrix. However, recently, an attempt to prepare a composite separator using continuous carbon fibers has been made.

Although the electrical resistance of stainless steel is significantly lower than that of graphite (see Table 1), the electrical contact resistance of graphite is measured lower than that of stainless steel, since the electrical contact resistance is related to the contact area and pressure and the hardness of the material.

Moreover, although the graphite satisfies the conditions of the separator in its electrical and chemical requirements, it is vulnerable to impact and is hard to process. Therefore, a research aimed at developing a continuous carbon fiber composite separator which satisfies the electrical, chemical, and mechanical requirements has continued to progress. Further, in order to reduce the contact resistance between the unit cells, and to efficiently discharge water produced by the reaction, a method for manufacturing a separator capable of controlling the surface energy of the continuous carbon fiber composite separator is required.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a method for manufacturing a composite separator for a polymer electrolyte membrane fuel cell, the method including: preparing a prepreg as a continuous carbon fiber-reinforced composite and a graphite foil; allowing the cut prepreg and graphite foil to pass through a stacking/compression roller to be compressed; allowing the prepreg in which the graphite foil is integrally stacked to be heated and pressed by a hot press such that hydrogen, air, and coolant flow fields are formed or to pass through a hot roller to be formed into a separator; removing unnecessary portions from the heated and pressed separator using a trim cutter; and post-curing the thus formed separator, wherein the graphite foil is stacked on the prepreg as the continuous carbon fiber-reinforced composite such that a graphite layer is integrally formed with the prepreg.

In another aspect, the present invention provides a method for manufacturing a composite separator for a polymer electrolyte membrane fuel cell, the method including: preparing a prepreg as a continuous carbon fiber-reinforced composite; preparing a mixed solution by mixing at least one selected from the group consisting of graphite flake, graphite powder, and carbon black nanoparticles with a resin solvent; applying the mixed solution to both surface of the prepreg while the prepreg passes through a cutting roller having a cutter to be cut in the longitudinal direction of the separator or applying the mixed solution to both surface of the prepreg while the prepreg cut by the cutting roller with the cutter passes through a stacking/compression roller; allowing the prepreg to which the mixed solution is applied to be heated and pressed by a hot press such that hydrogen, air, and coolant flow fields are formed or to pass through a hot roller to be formed into a separator; removing unnecessary portions from the heated and pressed separator using a trim cutter; and post-curing the thus formed separator, wherein the mixed solution is applied to the prepreg as the continuous carbon fiber-reinforced composite such that a graphite layer is integrally formed with the prepreg.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other aspects and features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
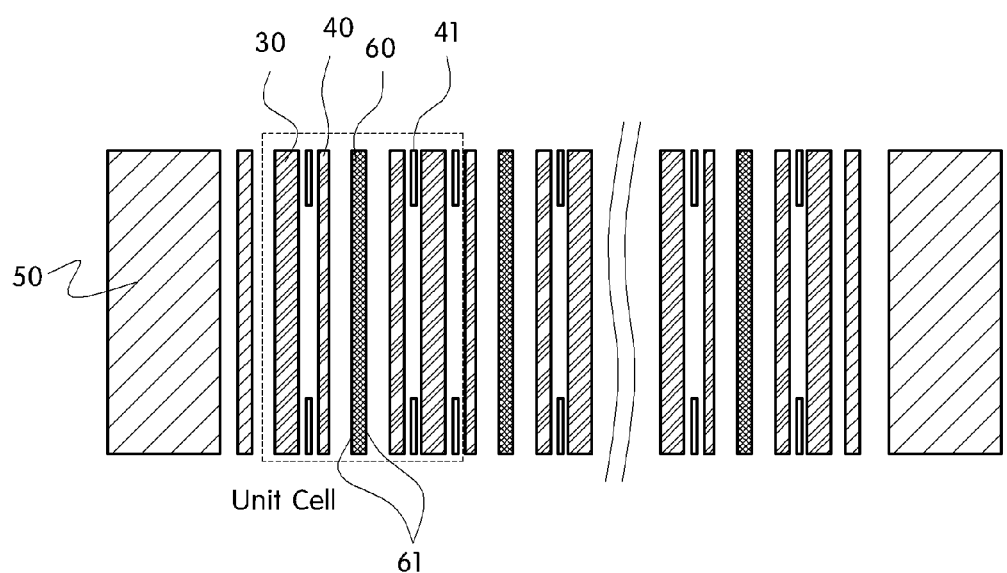
FIG. 1 is a schematic diagram showing the configuration of a fuel cell stack.

Reference numerals set forth in the Drawings includes reference to the following elements as further discussed below:

| | |
|---|---|
| 10: continuous carbon fiber prepreg | 11: graphite foil |
| 12: roll | 15: graphite flake and powder |
| 16: cutter | 18: cutting roller |
| 20: stacking/compression roller | 22: hot press |
| 24: positive and negative flow field patterns | |
| 26: trim cutter | 28: hot roller |
| 200: resin solvent | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

Detailed Description

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

For a better understanding of the present invention, the properties of a continuous carbon fiber-reinforced composite and graphite used in the manufacturing of the separator of the present invention, and those of other existing materials (carbon powder composite, metal (e.g., stainless steel (SUS)) are shown in the following table 1:

TABLE 1

| Properties | Graphite | Carbon powder composite | Metal (SUS) | Carbon fiber reinforced composite | DOE reference |
|---|---|---|---|---|---|
| Specific gravity (g/cm$^3$) | 1.88 | 1.92 | 7.87 | 1.9 | N/A |
| Thermal conductivity (Raw material, W/mK) | 100 | 08 to 20 | 16.3 | 48.4 to 60.6 | 40 |
| Contact resistance (@ 150 psig, mΩcm$^2$) | 15.6 | 20.2 | 75 | 20 to 30 | 25 |
| Coefficient of thermal expansion (10$^{-6}$/K) | 4.7 | 10 to 30 | 11 to 18 | −0.12 to 22 | N/A |

TABLE 1-continued

| Properties | Graphite | Carbon powder composite | Metal (SUS) | Carbon fiber reinforced composite | DOE reference |
|---|---|---|---|---|---|
| Electrical conductivity (S/cm) | 770 | 251 | 14,000 | 100 to 125 | Over 100 |
| Flexural strength (MPa) | 85 | 50 | 510 | 1,550 | Over 34 MPa |
| Compressive strength (MPa) | 170 | Satisfied | Satisfied | Satisfied | Over 105 MPa |
| Corrosion resistance | Satisfied | Satisfied | Expensive coating required | Satisfied | Over 1 mA/cm² |

As shown in Table 1, the continuous carbon fiber-reinforced composite used in the present invention can contribute to a reduction in weight with a specific gravity of about ¼ of the metal (SUS), reduce the thickness of the overall separator, which increases the reaction area per unit volume to increase the power density, and satisfy the compressive strength and the corrosion resistance. Moreover, the graphite forming the outermost end of the separator has a high thermal conductivity, a significantly low contact resistance, and a high surface energy (hydrophilicity) to quickly discharge water produced by a reaction, which reduces the current loss in the fuel cell stack, thus significantly increasing the efficiency of the fuel cell.

Therefore, the separator in accordance with the present invention can be easily manufactured by stacking a graphite foil prepared by compressing expanded graphite on a carbon fiber-reinforced composite prepreg or applying a mixed solution prepared by mixing graphite flake and powder with a resin solvent to the cured composite prepreg by a continuously process for mass production.

As discussed above, in one aspect, the present invention provides a method for manufacturing a composite separator for a polymer electrolyte membrane fuel cell, the method comprising: preparing a prepreg as a continuous carbon fiber-reinforced composite and a graphite foil; allowing the cut prepreg and graphite foil to pass through a stacking/compression roller to be compressed; allowing the prepreg in which the graphite foil is integrally stacked to be heated and pressed by a hot press such that hydrogen, air, and coolant flow fields are formed or to pass through a hot roller to be formed into a separator; removing unnecessary portions from the heated and pressed separator using a trim cutter; and post-curing the thus formed separator.

In embodiments, a prepreg as a continuous carbon fiber-reinforced composite and a graphite foil are prepared. The prepreg and the graphite foil are cut in a longitudinal direction of the separator by a cutting roller having a cutter. The cut prepreg and graphite foil are passed through a stacking/compression roller to be compressed. The stacked prepreg in which and the graphite foil are hot-pressed by a hot press or a hot roller such that hydrogen, air, and coolant flow fields are formed. Unnecessary portions from the hot-pressed stack of the prepreg and the graphite foil are trimmed using a trim cutter to be formed into a separator. The thus-formed separator is post-cured.

Preferably, the step of cutting may comprise a step of forming a common distribution manifold and assembly holes.

Suitably, before the step of compressing, there may be provided with a step of stacking the cut prepreg and the cut graphite foil in such a fashion that at least one of the prepreg is positioned between the graphite foils.

Preferably, the step of compressing may be conducted at a temperature range between about 40 degree C. and about 80 degree C.

Preferably, the step of hot-pressing may be conducted at a temperature range between about 150 degree C. and about 250 degree C.

Preferably, the step of post-curing may be conducted in an autoclave for about two hours at temperature of about 125 degree C.

As discussed above, in another aspect, the present invention provides a method for manufacturing a composite separator for a polymer electrolyte membrane fuel cell, the method comprising: preparing a prepreg as a continuous carbon fiber-reinforced composite; preparing a mixed solution by mixing at least one selected from the group consisting of graphite flake, graphite powder, and carbon black nanoparticles with a resin solvent; applying the mixed solution to both surface of the prepreg while the prepreg passes through a cutting roller having a cutter to be cut in the longitudinal direction of the separator or applying the mixed solution to both surface of the prepreg while the prepreg cut by the cutting roller having the cutter passes through a stacking/compression roller; allowing the prepreg to which the mixed solution is applied to be heated and pressed by a hot press such that hydrogen, air, and coolant flow fields are formed or to pass through a hot roller to be formed into a separator; removing unnecessary portions from the heated and pressed separator using a trim cutter; and post-curing the thus formed separator.

Examples for manufacturing separator in accordance with the present invention will be described below, but the present invention is not limited to the following Examples.

EXAMPLE 1

A continuous carbon fiber prepreg and a graphite foil were molded by a hot pressing process to manufacture a separator of the present invention.

Figure 2:
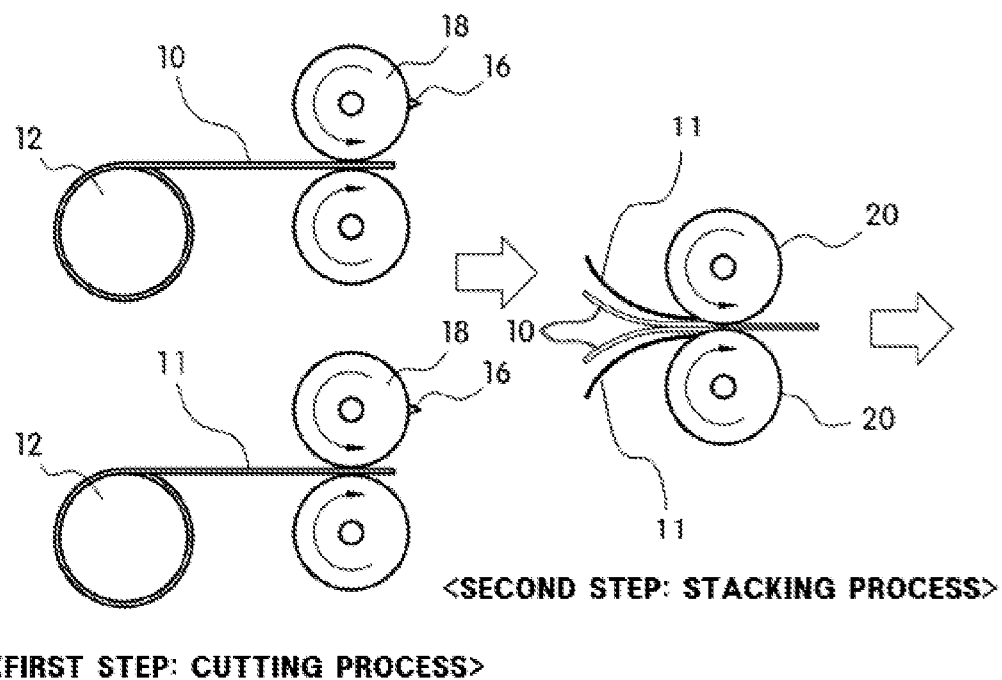
FIG. 2 is a process diagram showing a method for manufacturing a composite separator for a PEMFC according to Example 1 of the present invention.
Figure 2:
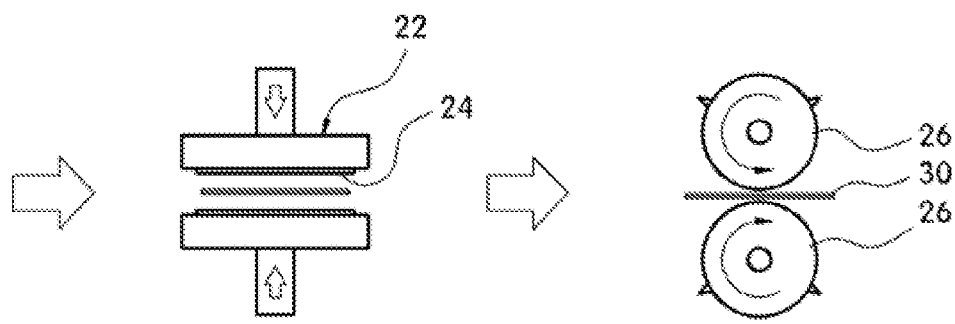

FIG. 2 is a process diagram showing the method used for manufacturing a composite separator according to Example 1.

First, a semi-cured sheet-like prepreg 10 as a raw material of a continuous carbon fiber-reinforced composite having a length of several meters to several tens of meters, in which continuous carbon fibers having a diameter of about 7 μm were surrounded by a thermosetting polymer binder, and a continuous graphite foil 11 were wound on a roll 12, respectively.

The prepreg 10 as the raw material of the continuous carbon fiber-reinforced composite and the graphite foil 11 were then passed through a plurality of cutting rollers 18 in the form of a long roll each including a cutter 16 provided on the surface thereof such that the prepreg 10 and the graphite foil 11 were cut in the longitudinal direction of the separator and, at the same time, a common distribution manifold and an assembly hole were formed on the prepreg 10.

Next, the prepreg 10 cut in the longitudinal direction of the separator and the graphite foil 11 stacked on both surfaces of the prepreg 10 were simultaneously passed through a stacking/compression roller 20 or a plurality of prepregs 10 cut in the longitudinal direction of the separator at regular intervals were arranged in a zigzag manner, i.e., arranged in parallel and perpendicular to the carbon fibers such as 0°/90°/0°, and the graphite foil 11 was stacked on both surfaces of the prepreg 10 and then passed through the stacking/compression roller 20. Here, the stacking/compression roller 20 was equipped with a separate heating means (not shown) such that the prepreg 10 and the graphite foils 11 were pressed and adhered at a temperature of 40 to 80° C. while passing through the stacking/compression roller 20. The reason for this was that if the prepreg 10 and the graphite foils 11 are pressed at a temperature of lower than 40° C., the adhesive strength between the prepreg 10 and the graphite foils 11 may be reduced, whereas, if they are pressed at a temperature of higher than 80° C., they may be cured. Therefore, it is preferable that the prepreg 10 and the graphite foils 11 be pressed in the temperature range of 40 to 80° C.

Next, the continuous carbon fiber prepreg 10 stacked in a single or multi-layer together with the graphite foils 11 was placed on a hot press 22 to be press-molded. Here, the molding temperature of the hot press 22 with respect to the prepreg 10 was maintained at a temperature of 150 to 250° C. The reason for this was that if the molding temperature is lower than 150° C., the moldability may be deteriorated, whereas, if it is higher than 250° C., the resin of the prepreg 10 may be cured.

Figure 4:
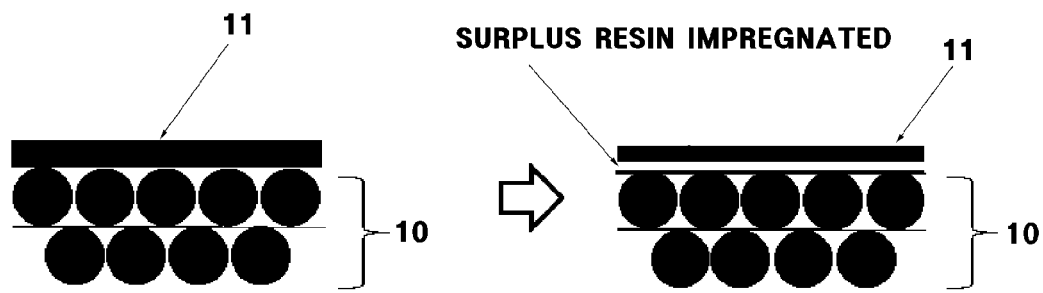
FIGS. 4 and 5 are schematic diagrams showing a graphite layer formed on a separator in accordance with the present invention.

As shown in FIG. 4, a small amount of surplus resin of the continuous carbon fiber prepreg 10 was impregnated into the graphite foil 11 stacked on the outermost end of the continuous carbon fiber prepreg 10 to be mechanically bonded thereto, and thereby a graphite layer was formed on the outermost end of the separator by the graphite foil 11. Meanwhile, the graphite foil 11 was prepared by compressing expanded graphite, and thus, upon completion of the molding process by the hot press 22, it was possible to easily separate the separator molded by the hot press 22 without the use of a release paper. Moreover, positive and negative flow field patterns 24 for forming hydrogen, air, and coolant flow fields were formed on upper and lower platens of the hot press 22. Therefore, the hydrogen, air, and coolant flow fields were formed on the prepreg 10 on which the graphite foils 11 were stacked by the press molding of the hot press 22.

Next, the heated and press-molded prepreg 10 including the graphite foils 11 was subjected to a trimming process of removing unnecessary portions from the separator using a trim cutter 26. The trimming process was performed within a minimum period of time such that the heated and press-molded prepreg 10 had a curing degree that could allow the prepreg 10 to maintain its shape.

Finally, a post-curing process, in which about 400 separators were placed in an autoclave at the same time to be heat-treated at about 125° C. for about 2 hours, was performed to allow the separators to be finally cured.

EXAMPLE 2

In this example, a continuous carbon fiber-reinforced composite and a graphite foil were molded by a hot rolling process to manufacture a separator of the present invention.

Figure 3:
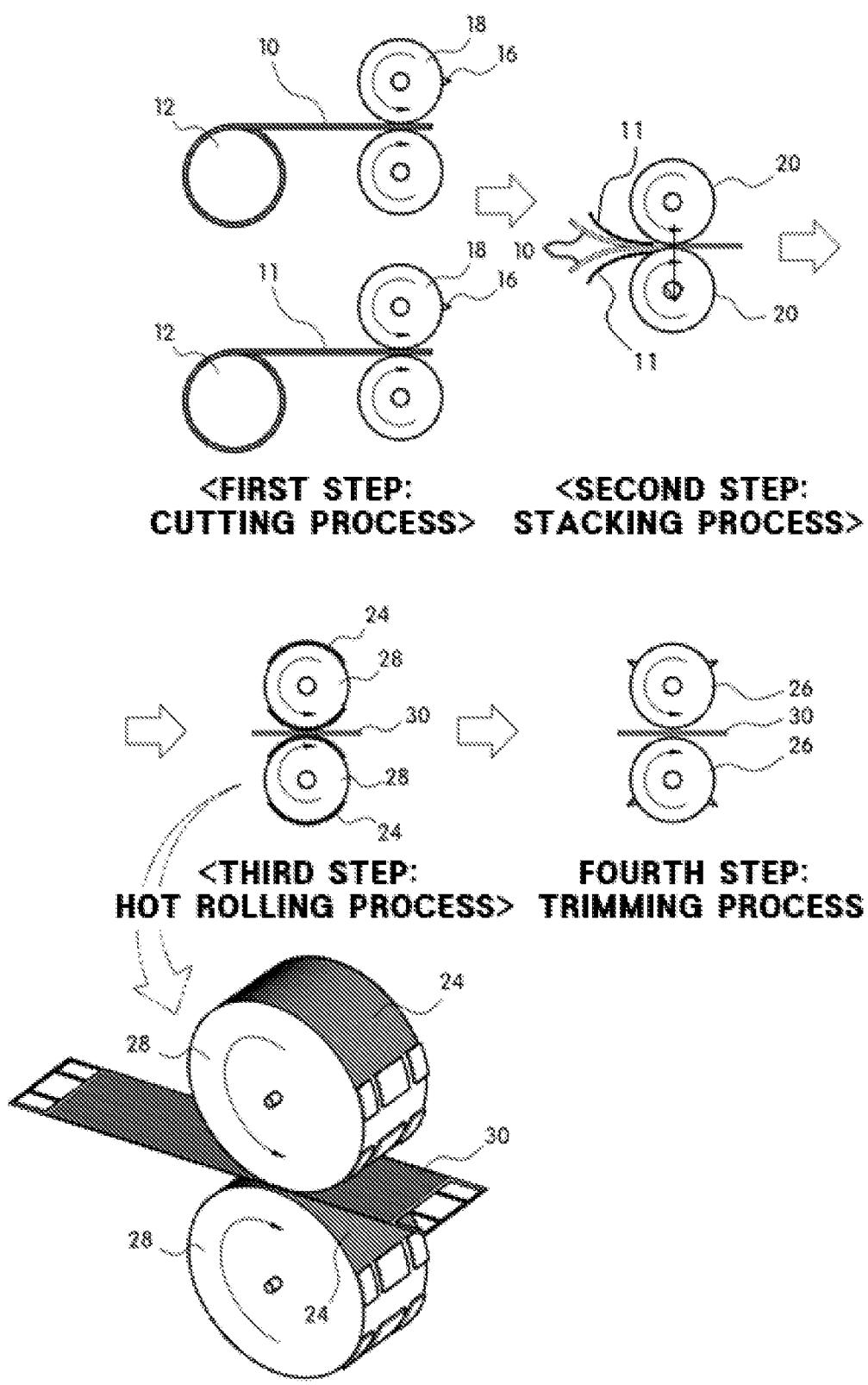
FIG. 3 is a process diagram showing a method for manufacturing a composite separator for a PEMFC according to Example 2 of the present invention.

FIG. 3 is a process diagram showing the method used for manufacturing a composite separator according to Example 2.

First, in the same manner as Example 1, a semi-cured sheet-like prepreg 10 as a raw material of a continuous carbon fiber-reinforced composite having a length of several meters to several tens of meters, in which continuous carbon fibers having a diameter of about 7 μm are surrounded by a thermosetting polymer binder, and a continuous graphite foil 11 were wound on a roll 12, respectively. The prepreg 10 as the raw material of the continuous carbon fiber-reinforced composite and the graphite foil 11 were passed through a plurality of cutting rollers 18 in the form of a long roll each including a cutter 16 provided on the surface thereof such that the prepreg 10 and the graphite foil 11 were cut in the longitudinal direction of the separator and, at the same time, a common distribution manifold and an assembly hole were formed on the prepreg 10.

Next, the prepreg 10 cut in the longitudinal direction of the separator and the graphite foil 11 stacked on both surfaces of the prepreg 10 were simultaneously passed through a stacking/compression roller 20 or a plurality of prepregs 10 cut in the longitudinal direction of the separator at regular intervals were arranged in a zigzag manner, i.e., arranged in parallel and perpendicular to the carbon fibers such as 0°/90°/0°, and the graphite foil 11 was stacked on both surfaces of the prepreg 10 and then passed through the stacking/compression roller 20. Here, the stacking/compression roller 20 was equipped with a separate heating means (not shown) such that the prepreg 10 and the graphite foils 11 were pressed and adhered at a temperature of 40 to 80° C. while passing through the stacking/compression roller 20. The reason for this was that if the prepreg 10 and the graphite foils 11 are pressed at a temperature of lower than 40° C., the adhesive strength between the prepreg 10 and the graphite foils 11 may be reduced, whereas, if they are pressed at a temperature of higher than 80° C., they may be cured. Therefore, it is preferable that the prepreg 10 and the graphite foils 11 be pressed in the temperature range of 40 to 80° C.

Next, the continuous carbon fiber prepreg 10 stacked in a single or multi-layer together with the graphite foils 11 was placed on a hot roller 28 to be press-molded, heated, and partially cured. Here, positive and negative flow field patterns 24 for forming hydrogen, air, and coolant flow fields were formed on a surface of the hot roller 28. Accordingly, the hydrogen, air, and coolant flow fields were formed on the prepreg 10 while the prepreg 10 and the graphite foil 11 were passed through the hot roller 28 to be press-molded. A small amount of surplus resin of the continuous carbon fiber prepreg 10 was impregnated into the graphite foil 11 in the same manner as Example 1, and thereby a graphite layer was formed on the outermost end of the separator. Meanwhile, the heating temperature of the hot roller 28 with respect to the prepreg 10 was maintained at a temperature of 150 to 250° C., although the heating temperature was different depending on the types of resin of the prepreg 10.

Next, the heated and press-molded prepreg 10 including the graphite foils 11 was subjected to a trimming process of removing unnecessary portions from the separator using a trim cutter 26.

Finally, a post-curing process, in which about 400 separators were placed in an autoclave at the same time to be heat-treated at about 125° C. for about 2 hours, was performed to allow the separators to be finally cured.

Unlike the conventional method in which the powder-based composite is molded into the separator using a mold, according to the present invention it is possible to easily manufacture the separator having the graphite layer by the continuous hot pressing or hot rolling process for mass production, in which the graphite foil is stacked on the continuous carbon fiber-reinforced composite prepreg or the graphite in the form of powder is sprayed onto the continuous carbon fiber-reinforced composite prepreg.

As can be seen from the above-described Examples 1 and 2, it is possible to form the graphite layer by stacking the graphite foil on the continuous carbon fiber-reinforced composite prepreg to be molded by a hot press or hot roller.

EXAMPLE 3

In this example, a mixed solution prepared by mixing at least one selected from the group consisting of graphite flake, graphite powder, and carbon black nanoparticles with a resin solvent was used.

Figure 5:
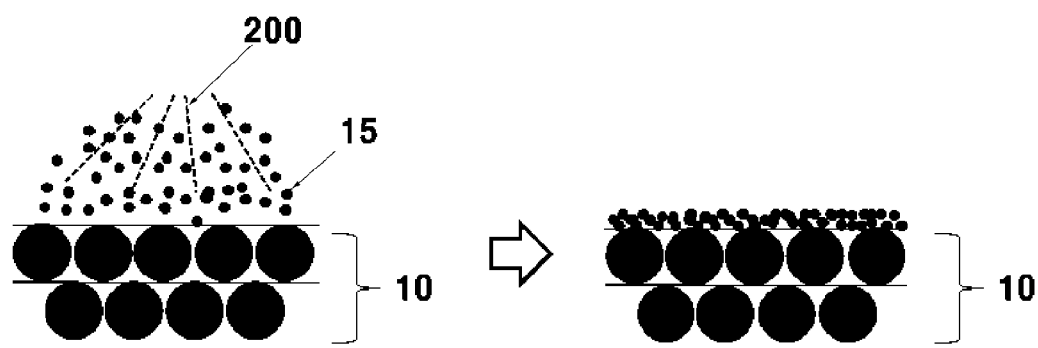

For example, as shown in FIG. 5, it is possible to form the graphite layer by mixing graphite flake and powder 15 or carbon black with a resin solvent 200 such as methylethylketone (MEK) or acetone and spraying the mixture onto the continuous carbon fiber-reinforced composite prepreg. That is, a process of mixing graphite flake and powder having a particle size of 3 to 500 μm (5,000 mesh-35 mesh) or carbon black as nanoparticles with a resin solvent and spraying the mixture on the prepreg may be performed between the process of cutting the prepreg and the process of passing the prepreg through the stacking/compression roller. As shown in FIG. 5, the graphite flake and powder 15 are mixed with the resin solvent 200 and the mixture is sprayed onto the outermost surface of the stacked prepreg.

Therefore, the graphite particles sprayed with the solvent remain on the surface of the composite to form the graphite layer, thus reducing the electrical contact resistance, increasing the hydrophilicity of the separator surface, and further serving as a release paper used during the molding process of the separator.

TEST EXAMPLE 1

Figure 6:
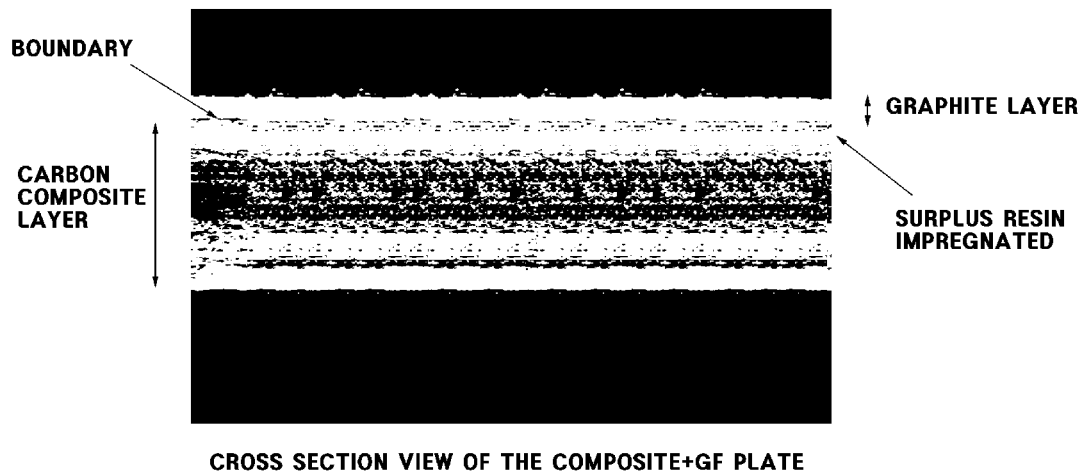
FIG. 6 is an electron microscope image of a graphite layer formed on a separator in accordance with the present invention.

It was determined whether the graphite foil was integrally stacked on the continuous carbon fiber prepreg of the separators manufactured according to Examples 1 and 2 by photographing the cross sections of the separator specimens using an electron microscope, and the results are shown in FIG. 6.

As shown in FIG. 6, it can be seen that the graphite layer was integrally formed on the surface of the continuous carbon fiber prepreg and a part of the graphite layer was impregnated into the continuous carbon fiber prepreg with respect to the boundary between the continuous carbon fiber prepreg and the graphite layer.

TEST EXAMPLE 2

Figure 7:
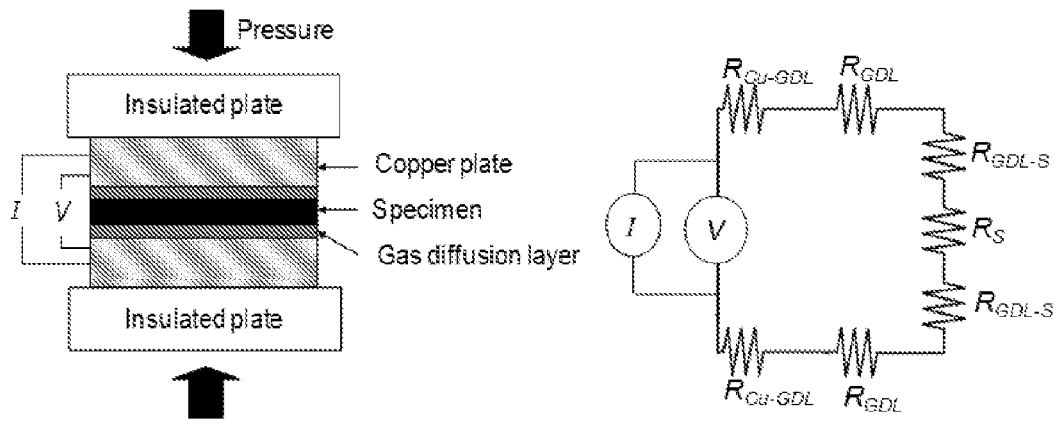
FIG. 7 is a schematic diagram showing an electrical resistance test on a separator specimen in accordance with the present invention.

The electrical resistances of the specimens used in Test Example 1, the separator specimens in which the graphite foil was stacked on the continuous carbon fiber prepreg according to Examples 1 and 2, the separator specimen in which carbon black particles were applied to the continuous carbon fiber prepreg according to Example 3, and a specimen with no graphite layer according to Comparative Example, were measured in such a manner that a gas diffusion layer was disposed on a copper plate attached on the inner surface of each insulating plate and the specimen was interposed between the gas diffusion layers and fixed at a predetermined clamping pressure as shown in FIG. 7.

Here, since the specimen according to the Comparative Example had no graphite layer, its thickness was 0.67 t, and the specimens according to Examples 1 and 2 of the present invention having the graphite layer had an increased thickness of 0.8 t.

The measured electrical resistances of the specimens according to Examples 1 and 2 of the present invention, the specimen in which carbon black particles were applied to the continuous carbon fiber prepreg according to Example 3, and the specimen with no graphite layer according to the Comparative Example are shown in the following table 2 and the graphs of FIGS. 8A and 8B:

TABLE 2

| Pressure (MPa) | Comparative Example (mΩ) Composite plates (0.67 t) | Examples 1 and 2 (mΩ) Composite plates (0.8 t) + Graphite foil on both sides | Example 3 (mΩ) Composite plate (0.2 t) + Carbon black on both sides |
|---|---|---|---|
| 0.50 | 31.71 | 5.57 | 3.43 |
| 0.75 | 26.71 | 4.71 | 2.29 |
| 1.00 | 23.14 | 4.29 | 1.86 |
| 1.25 | 21.43 | 4.00 | 1.57 |
| 1.5 | 19.86 | 3.71 | 1.29 |
| 1.75 | 18.71 | 3.57 | 1.14 |
| 2.00 | 17.57 | 3.43 | 1.00 |

Figure 8:
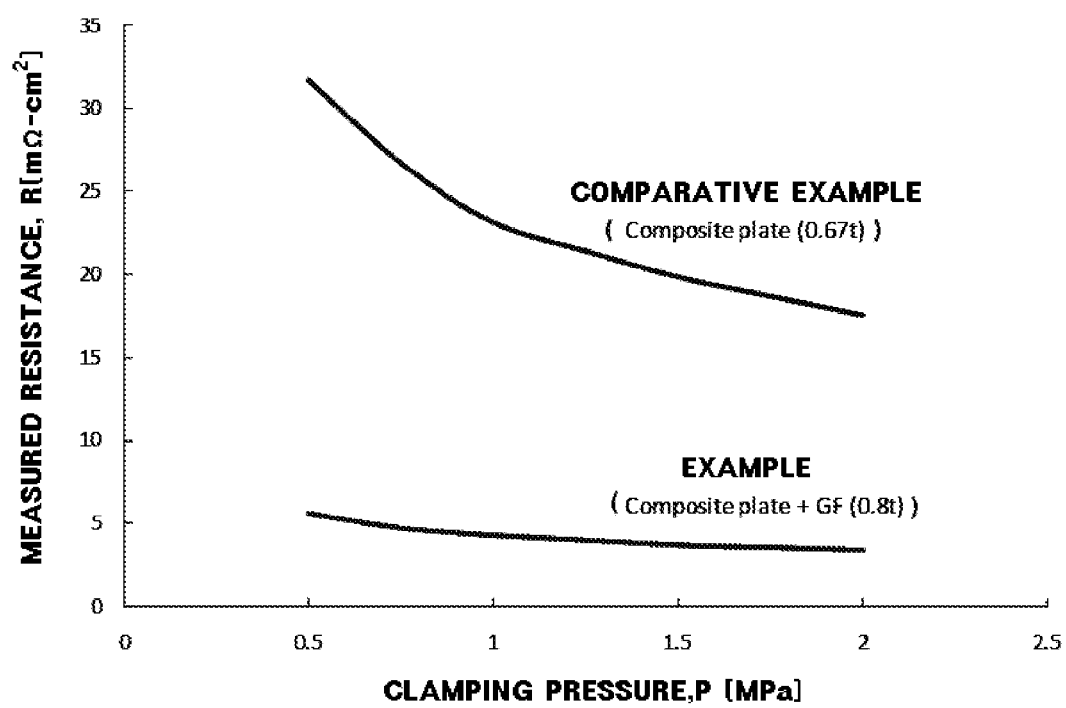
FIG. 8 is a graph showing the results of the electrical resistance test on a separator specimen in accordance with the present invention and a conventional separator specimen.

As shown in table 2 and FIG. 8, it can be seen that the total electrical resistances ($R_{TOTAL}$) measured from the specimens according to Examples 1 and 2 of the present invention was about 18% of that of the specimen according to the Comparative Example, from which it can be understood that it is possible to significantly reduce the electrical contact resistance by forming the graphite layer on the continuous carbon fiber prepreg.

According to the present invention, the graphite layer is formed on the outermost end of the continuous carbon fiber composite separator to reduce the electrical contact resistance and increase the hydrophilicity of the surface of the separator, thus efficiently removing water produced by the reaction from the fuel cell. That is, the graphite foil prepared by compressing expanded graphite is stacked on the carbon fiber-reinforced composite prepreg or the mixed solution prepared by mixing graphite flake and powder with a resin solvent is applied to the cured composite prepreg such that the graphite layer is integrally formed on the outermost end of the separator, thus reducing the electrical contact resistance of the separator and increasing the hydrophilicity of the surface of the separator. As a result, it is possible to efficiently discharge water produced by the reaction, thereby reducing the energy loss.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a composite separator for a polymer electrolyte membrane fuel cell, the method comprising:

preparing a prepreg as a continuous carbon fiber-reinforced composite and a graphite foil prepared by compressing expanded graphite, the prepreg being a semi-cured sheet-like prepreg, the continuous carbon fiber-reinforced composite including continuous carbon fibers each of which is surrounded by a thermosetting polymer binder, the continuous carbon fibers having a length of several meters to several tens of meters;

allowing the prepreg and the graphite foil to pass through a cutting roller with a cutter to be cut in the longitudinal direction of the composite separator;

allowing the cut prepreg and graphite foil to pass through a stacking/compression roller to be compressed;

allowing the prepreg in which the graphite foil is integrally stacked to be heated and pressed by a hot press such that hydrogen, air, and coolant flow fields are formed on the prepreg on both surfaces of which the graphite foil is stacked and at the same time on the graphite foil, or to pass through a hot roller to be formed into a separator;

removing unnecessary portions from the heated and pressed separator using a trim cutter; and post-curing the thus formed separator, wherein the graphite foil is stacked on the prepreg as the continuous carbon fiber-reinforced composite such that a graphite layer is integrally formed with the prepreg.

2. A separator for a fuel cell prepared by the method of claim 1, wherein the graphite layer is integrally formed on the outer surface of the prepreg.

3. The separator of claim 2, wherein at least a portion of surplus resin of the prepreg is impregnated into the graphite layer formed by the graphite foil stacked on the outermost end of the prepreg to be mechanically bonded thereto.

* * * * *